United States Patent
Suresh

(10) Patent No.: US 11,483,295 B2
(45) Date of Patent: Oct. 25, 2022

(54) METHOD FOR SECURELY NEGOTIATING END-TO-END CRYPTOGRAPHIC CONTEXT USING INLINE MESSAGES THROUGH MULTIPLE PROXIES IN CLOUD AND CUSTOMER ENVIRONMENT

(71) Applicant: Citrix Systems, Inc., Fort Lauderdale, FL (US)

(72) Inventor: Viswanath Yarangatta Suresh, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 45 days.

(21) Appl. No.: 16/210,840

(22) Filed: Dec. 5, 2018

(65) Prior Publication Data

US 2020/0186502 A1 Jun. 11, 2020

(51) Int. Cl.
*H04L 29/06* (2006.01)
*H04L 9/40* (2022.01)
(Continued)

(52) U.S. Cl.
CPC .......... *H04L 63/0428* (2013.01); *H04L 9/088* (2013.01); *H04L 9/30* (2013.01); *H04L 63/08* (2013.01); *H04L 67/01* (2022.05)

(58) Field of Classification Search
CPC ....... H04L 63/0428; H04L 9/088; H04L 9/30; H04L 63/08; H04L 67/42; H04L 67/01;
(Continued)

(56) References Cited

U.S. PATENT DOCUMENTS

| 6,996,841 B2 * | 2/2006 | Kadyk | ............... H04L 63/0281 713/150 |
| 2011/0093609 A1 * | 4/2011 | Blom | .................. H04L 63/0428 709/231 |

(Continued)

FOREIGN PATENT DOCUMENTS

EP 1 251 670 A2 10/2002

OTHER PUBLICATIONS

International Search Report and Written Opinion for International Appl. No. PCT/US2019/064264, dated Feb. 10, 2020.
(Continued)

*Primary Examiner* — Jeremy S Duffield
*Assistant Examiner* — Andrew Suh
(74) *Attorney, Agent, or Firm* — Foley & Lardner LLP

(57) ABSTRACT

Described embodiments provide systems and methods for establishing an end-to-end cryptographic context. A service node may be located intermediary between a client and server which provides a service to the client. At least one network device may be located intermediary between the service node and the server. The service node may obtain information for validating the service. The service node may establish an end-to-end cryptographic context between the service node and server through the network device(s). A first network device of the network device(s) may share a cryptographic context with the service node, which existed prior to establishment of the end-to-end cryptographic context. The service node may transmit a message to the network device encrypted using the first cryptographic context. The encrypted message may inform the first network device to pass through traffic that is encrypted using the end-to-end cryptographic context.

20 Claims, 9 Drawing Sheets

(51) Int. Cl.
H04L 9/08 (2006.01)
H04L 9/30 (2006.01)
H04L 67/01 (2022.01)

(58) Field of Classification Search
CPC . H04L 63/06; H04L 63/0281; H04L 63/0464; H04L 63/0471
See application file for complete search history.

(56) References Cited

U.S. PATENT DOCUMENTS

| | | | | |
|---|---|---|---|---|
| 2011/0231651 A1* | 9/2011 | Bollay | ................ | H04L 63/0245 713/152 |
| 2014/0259147 A1* | 9/2014 | L'Heureux | ........... | H04L 63/083 726/14 |
| 2014/0331297 A1* | 11/2014 | Innes | .................. | H04L 63/0281 726/7 |
| 2015/0271205 A1* | 9/2015 | Duminuco | ............ | H04L 63/168 713/151 |
| 2015/0341466 A1* | 11/2015 | Sah | ..................... | H04L 67/1002 707/770 |
| 2016/0127414 A1* | 5/2016 | Mazur | ................. | H04L 63/1408 713/151 |
| 2016/0366191 A1 | 12/2016 | Patil et al. | | |
| 2018/0097638 A1* | 4/2018 | Haldenby | ........... | H04W 12/041 |

OTHER PUBLICATIONS

International Preliminary Report on Patentability on PCT Appl. No. PCT/US2019/064264, dated Jun. 17, 2021.
First Examination Report on AU Appl. No. 2019392478 dated Feb. 25, 2022.
Examiner's Report on CA Appl. No. 3121503 dated Jul. 12, 2022.

* cited by examiner

METHOD FOR SECURELY NEGOTIATING END-TO-END CRYPTOGRAPHIC CONTEXT USING INLINE MESSAGES THROUGH MULTIPLE PROXIES IN CLOUD AND CUSTOMER ENVIRONMENT

FIELD OF THE DISCLOSURE

The present application generally relates to communicating network packets, including but not limited to systems and methods for negotiating cryptographic contexts.

BACKGROUND

In a typical computing environment, a client (also referred to as a client device) receives information, traffic, packets, etc., from a server. Packets may be encrypted by a server using various cryptographic algorithms prior to transmission over a network. In some instances, the packets may be communicated from the server, through one or more networks or other intermediary devices, and to the client. At each stage, the packets may be decrypted, re-encrypted, and finally decrypted at the client. This process may lead to excess consumption of computing resources, such as processing bandwidth, memory, and energy, throughout the computing system.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

Described herein are systems and methods for establishing an end-to-end cryptographic context. A service node may securely negotiate an end-to-end cryptographic context using in-line messages through multiple proxies (also referred to herein as network devices), thus avoiding unnecessary decryption and re-encryption of data traffic by the network device(s). A cryptographic context can include or correspond to an encryption and/or decryption configuration or arrangement (e.g., cryptographic level (e.g., 64 or 128 bit), type, protocol, method, and so on) shared between two or more nodes for communicating packets with each other. An end-to-end cryptographic context can refer to a cryptographic context that extends (e.g., is shared) between a sender (or source) and recipient (or destination) of traffic, and also extends over (e.g., is shared with) network device(s) intermediary between the sender and the recipient. An end-to-end cryptographic context can be configured such that the traffic is not decrypted by any of the intermediary network devices. Accordingly, in-flight and stored data remains encrypted and is not decrypted by intermediary network devices other than nodes corresponding to the source or final destination.

Once the end-to-end cryptographic context is established, traffic may be passed through the network devices (e.g., the network devices may be switched to a 'bit-pump mode'). Services delivered from server(s) to client device(s) via the network devices may be validated, authenticated, etc. The services may be validated or authenticated by, for instance, validating the ownership of the public key associated with the service, through a Pre-Shared Key (PSK), or through other validation methods. The service node may obtain information about the validation information (e.g., information about the public key, PSK, etc., for the service) through initial packets from the client, for instance.

In some instances, cloud services or other remotely-hosted software may relay traffic through a customer's firewall over an extended period of time. Such traffic may be encrypted. Furthermore, such traffic may pass through multiple components (or proxies, network devices, intermediary devices, etc.) in the path from server to client. In such instances, a separate cryptographic context is created between each network device in the path. The separate cryptographic contexts may delay traffic and increase load as the traffic is decrypted and re-encrypted on each leg.

Where multiple network devices are located between the service node and the servers, traffic is decrypted and re-encrypted on each leg. According to certain embodiments described herein, while network devices may be in-line (e.g., in the path between the server and client), the network devices may operate in a 'bit-bump mode', or pass through encrypted network traffic, hence avoiding unnecessary decryption and re-encryption of traffic by intermediary network devices. To avoid unnecessary encryption and decryption of data traffic by the network device(s), the service node can negotiate an end-to-end cryptographic context using inline messages.

In some implementations, during end-to-end cryptographic context negotiation, the service node may validate the service. The service node may validate the service by validating ownership of a public key associated with the service. The service node may validate the service through a Pre-Shared Key (PSK). The service node may validate the service through a parameter uniquely associated with the service. The service node may validate the service through authentication of the service. Such information (e.g., public key, PSK, parameter, etc.) may be obtained by the service node in initial packets from the client, for instance. In some embodiments, the information may be requested and/or accessed from a different entity or source (e.g., based on configuration and/or information contained in the initial packets). For instance, depending on various network configurations or implementations, the information for validating the service may be obtained from an external secure ticket authority (STA) server. The STA server may store, generate and/or provide various validation information corresponding to the different services. The service node may identify data associated with the service in the initial packets, and may identify or cross-reference the validation information in the STA server with the data associated with the service (e.g., to request, access, select and/or use the corresponding data from the STA server).

Where an end-to-end cryptographic context is established, the service node may instruct the network devices to switch to 'bit pump mode,' or pass network traffic directly through to the client without decrypting and re-encrypting the network traffic at the network devices. The service node may so instruct the network devices by sending an encrypted message using an existing cryptographic context established with that network device. The network device may decrypt the packet containing the instructions and prepare to switch to 'bit pump mode' according to the instructions for instance. The network device may re-encrypt the instructions (e.g., using a corresponding cryptographic context previously established with the next network device) and pass the encrypted packet to the next network device in the chain. Such a process may be repeated until the packet containing the instructions is propagated from the service node through the network devices to the server hosting the service.

In some embodiments, each of the network devices may provide an acknowledgement (e.g., back along the chain of network devices) of receiving the instructions prior to switching to 'bit pump mode.' Hence, the network devices may wait for an acknowledgement from the next network device prior to switching to 'bit pump mode.'

In some implementations, some network devices (e.g., those on the client-side) may not require or use cryptographic contexts (sometimes referred to as "crypto contexts"). Such network devices may switch to bit pump mode following the service node establishing an end-to-end cryptographic context. For instance, with Citrix Inc.'s Netscaler gateway service (NGS), where a connector may be the only component through which the service can be reached in a customer environment, the connection between connector and server/service may not require a cryptographic context. In such a scenario, establishing an end-to-end cryptographic context for data traffic between service node and servers through the connector would work similar to on-premises support of gateway features. Hence, such implementations may not require modification of the server or service. In some embodiments, the client may be connected to the server through a client-side service node, a connector, and/or a flow redirector intermediate between the service node and connector. Hence, the connector and server may be adjacent to one another. In such embodiments, the connector may be the only component through which the service may be reached in the customer environment. For instance, where the client requests access to the service executing on the server, such a request may only be provided to the server through the connector.

Once an end-to-end cryptographic context is created between the service node in the cloud (e.g., a network that can include network device(s)) and the server, the network devices are switched to 'bit pump mode', avoiding unnecessary decryption and re-encryption of data packets. Hence, although the network devices may be inline and can span across one or more networks, they operate in 'bit-pump mode' with an end-to-end cryptographic context established.

In some embodiments, for instance embodiments corresponding to cloud-based VPX (e.g., an intermediary device that provides web and application load balancing, secure and remote access, acceleration, security and/or offload feature set in a virtual appliance), some hardware may not be capable of or configured to establish cryptographic capabilities. Hence, such networks and computing environments rely on various software cryptographic engines for encryption and decryption, which is time consuming and can negatively impact traffic load.

In implementations including a Remote Desktop Protocol (RDP) network device which uses CredSSP (or other) encryption for instance, the certification used within the encryption protocol may be the same certification used in the Transport Layer Security (TLS) or Datagram Transport Layer Security (DTLS) handshake for establishing the connection between the server and a Virtual Desktop Agent (VDA). When multiple TLS/DTLS offloads are involved, data packets with TLS/DTLS may be encapsulated within other TLS/DTLS for establishing the necessary connections. Such encapsulation may deteriorate performance and user experience. Further, such encapsulation may involve fragmentation and re-assembly for some packets due to multiple encapsulation (TLS/DTLS over TLS/DTLS).

By establishing an end-to-end cryptographic context and avoiding multiple unnecessary decryption and re-encryption of data traffic by network devices, many cloud-based features may operate similar to on-premise features. Hence, features may be delivered and supported faster on cloud, thus improving time to market availability of existing cloud-based features.

In one aspect, this disclosure is directed to a system for establishing an end-to-end cryptographic context. The system may include a service node that is intermediary between a client and a server. The service node may be in communication with at least one network device intermediary between the service node and the server. The server may provide a service to the client via the service node and the at least one network device. The service node may be configured to obtain information to validate the service. The service node may be configured to establish an end-to-end cryptographic context between the service node and the server through the at least one network device responsive to validating the service. The at least one network device may include a first network device that shares a first cryptographic context with the service node. The first cryptographic context may exist prior to establishment of the end-to-end cryptographic context. The service node may be configured to transmit a message to the first network device encrypted using the first cryptographic context (sometimes referred to as the encrypted message). The encrypted message may inform the first network device to pass traffic that is encrypted using the end-to-end cryptographic context through the first network device.

In some embodiments, the service node is configured to validate the service by validating ownership of a public key associated with the service. In some embodiments, the service node is configured to validate the service using information about a pre-shared key (PSK). In some embodiments, the service node is configured to validate the service using information about a parameter uniquely associated with the service. The information about the parameter may be obtained through one or more packets from the client. In some embodiments, the service node is configured to validate the service by authenticating the service.

In some embodiments, the service node is configured to transmit the encrypted message (e.g., message encrypted using the first cryptographic context) to the first network device. The service node may be configured to cause the first network device to decrypt the encrypted message using the first cryptographic context. The service node may be configured to receive an indication from the decrypted message. The indication may indicate that the first network device is to pass traffic that is encrypted using the end-to-end cryptographic context through the first network device.

In some embodiments, the service node is configured to transmit the encrypted message to the first network device. The service node may be configured to further cause the first network device to encrypt the decrypted message using a second cryptographic context shared with a second network device of the at least one network device, for transmission to the second network device.

In some embodiments, the service node is configured to transmit the encrypted message to the first network device. The service node may be configured to cause the first network device to pass traffic that is encrypted using the end-to-end cryptographic context through the first network device, without decrypting or re-encrypting the traffic at the first network device.

In some embodiments, the service node is configured to receive an acknowledgment message from the first network device. The acknowledgment message may be received responsive to the encrypted message and an acknowledgment message received by the first network device. The service node may be further configured to transmit to the first network device traffic that is encrypted using the end-to-end cryptographic context, responsive to receiving the acknowledgment message from the first network device.

In another aspect, this disclosure is directed to a method for establishing an end-to-end cryptographic context. The method may include receiving, by a service node intermediary between a client and a server, information to validate a service that the server provides to the client via the service node and at least one network device. The at least one network device may be intermediary between the service node and the server. The method may include establishing, by the service node responsive to validating the service, an end-to-end cryptographic context between the service node and the server through the at least one network device. The at least one network device may include a first network device that shares a first cryptographic context with the service node. The first cryptographic context may exist prior to establishment of the end-to-end cryptographic context. The method may include transmitting, by the service node, a message to the first network device encrypted using the first cryptographic context. The encrypted message may inform the first network device to pass traffic that is encrypted using the end-to-end cryptographic context through the first network device.

In some embodiments, the method further includes validating the service by validating ownership of a public key associated with the service. In some embodiments, the method further includes validating the service using information about a pre-shared key (PSK). In some embodiments, the method further includes validating the service using information about a parameter uniquely associated with the service. The information may be obtained through one or more packets from the client.

In some embodiments, the method further includes validating the service by authenticating the service. In some embodiments, the method further includes causing, by transmitting the encrypted message to the first network device, the first network device to decrypt the encrypted message using the first cryptographic context. The method may further include causing the first network device to receive an indication from the decrypted message that the first network device is to pass traffic that is encrypted using the end-to-end cryptographic context through the first network device.

In some embodiments, the method further includes causing, by transmitting the encrypted message to the first network device, the first network device to encrypt the decrypted message using a second cryptographic context shared with a second network device of the at least one network device, for transmission to the second network device. In some embodiments, the method further includes causing, by transmitting the encrypted message to the first network device, the first network device to pass traffic that is encrypted using the end-to-end cryptographic context through the first network device, without decrypting or re-encrypting the traffic at the first network device.

In some embodiments, the method further includes receiving, by the service node, an acknowledgment message from the first network device. The acknowledgment message may be received responsive to the encrypted message and an acknowledgment message received by the first network device. In some embodiments, the method further includes transmitting, by the service node to the first network device, traffic that is encrypted using the end-to-end cryptographic context, responsive to receiving the acknowledgment message from the first network device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
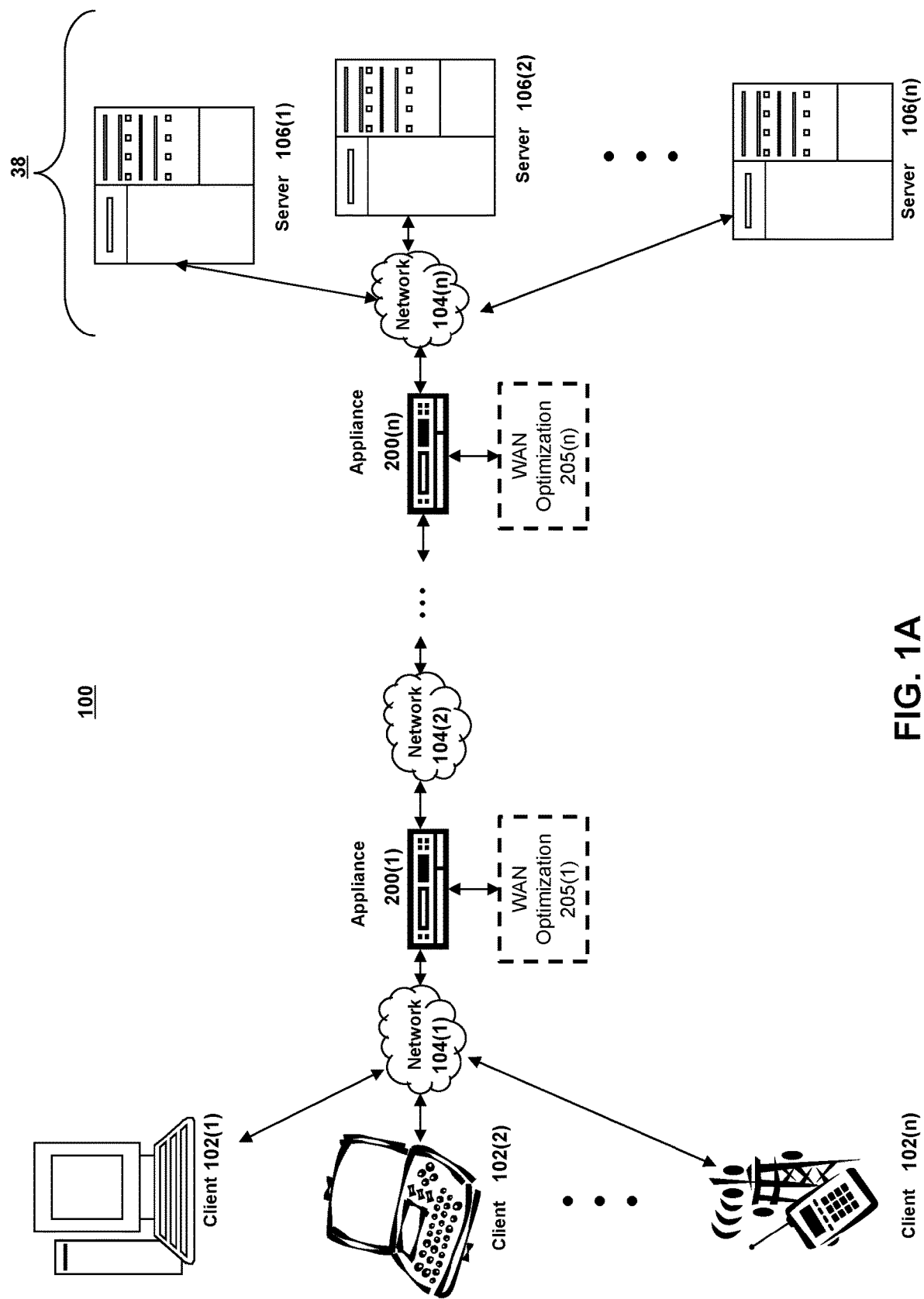
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for establishing an end-to-end cryptographic context.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
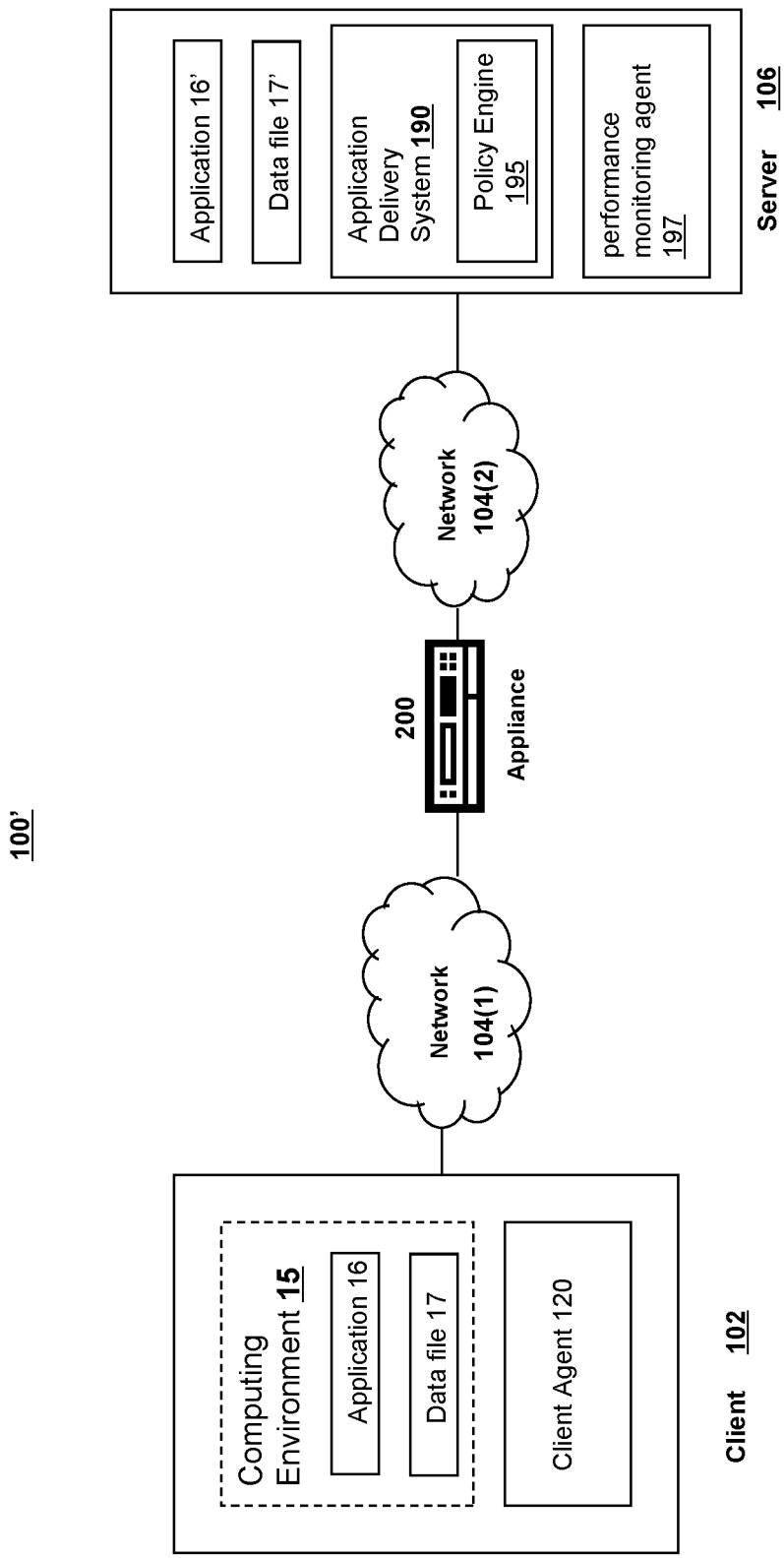
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
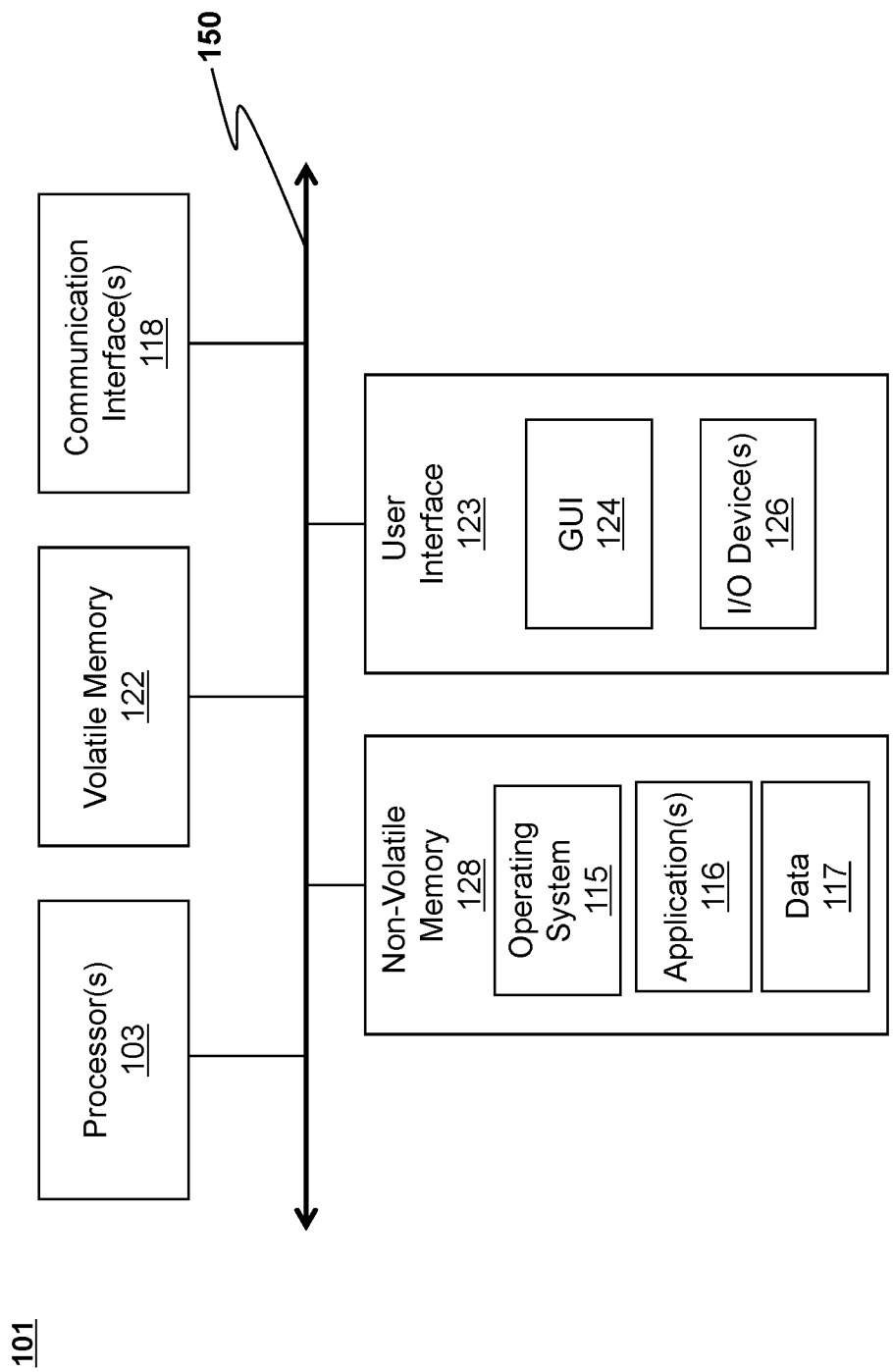
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
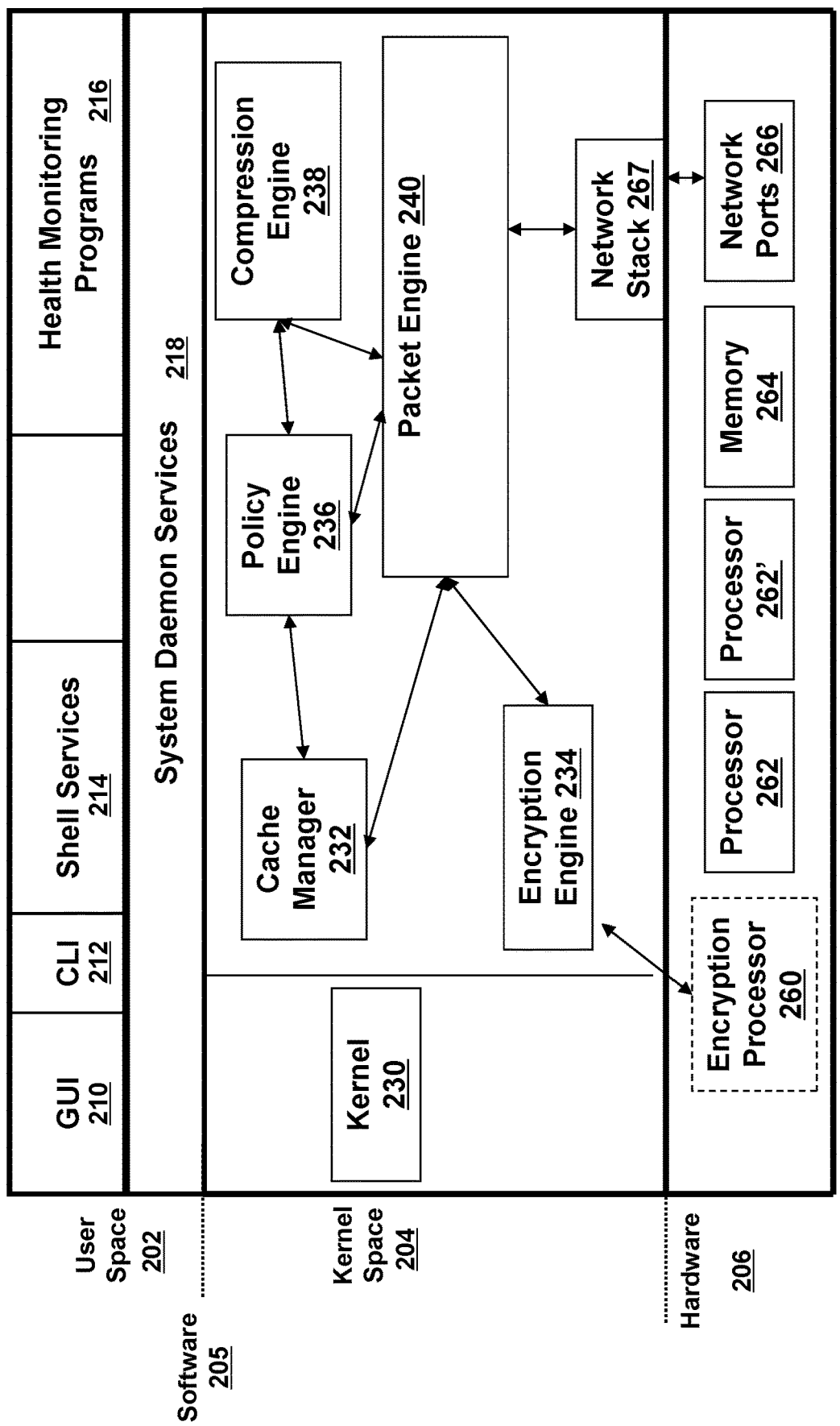
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
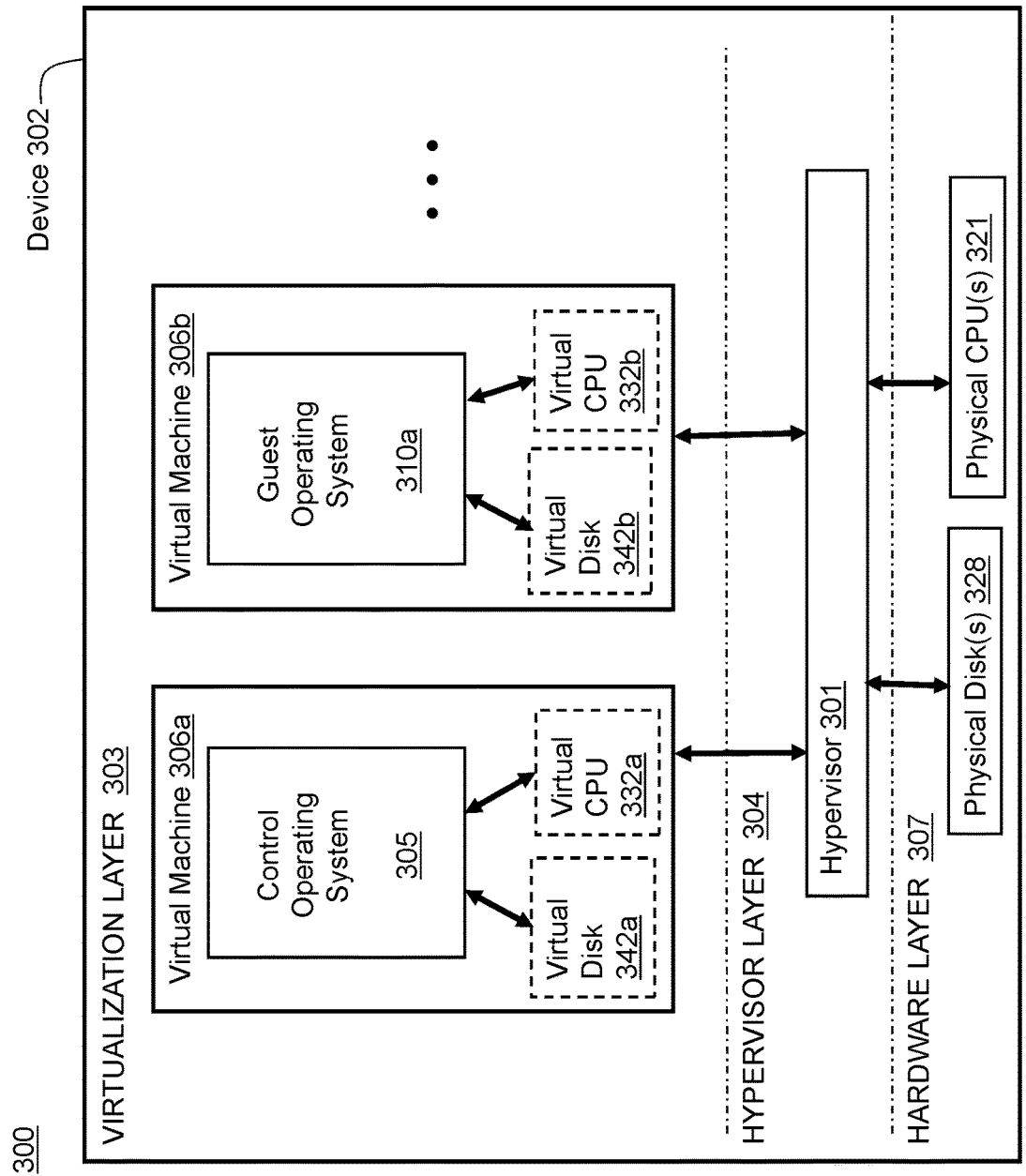
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hash values from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
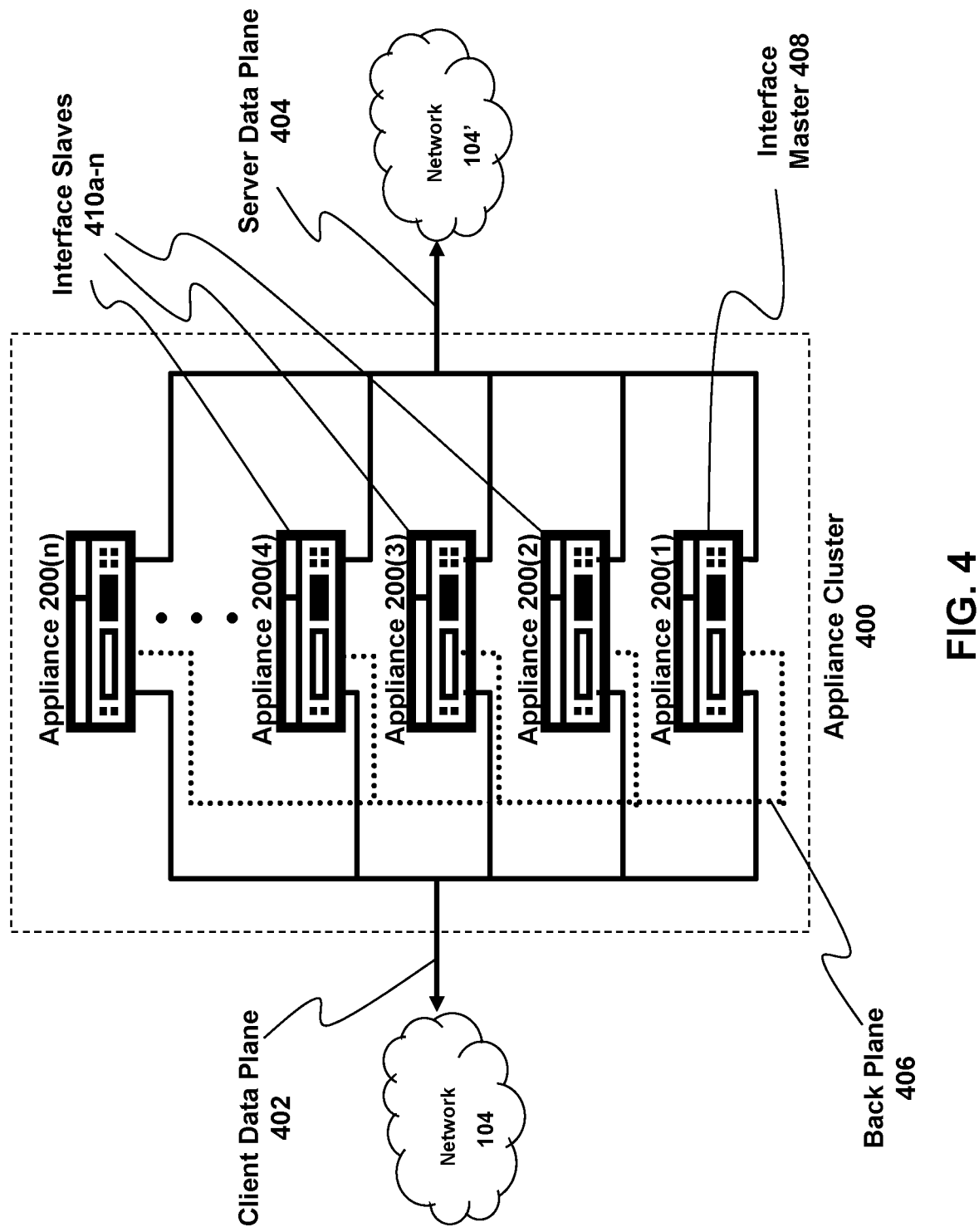
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Establishing an End-to-End Cryptographic Context

Described herein are systems and methods for establishing an end-to-end cryptographic context. A service node may securely negotiate an end-to-end cryptographic context using in-line messages through multiple proxies (also referred to herein as network devices), thus avoiding unnecessary decryption and re-encryption of data traffic by the network device(s). Once the end-to-end cryptographic context is established, traffic may be passed through the network devices (e.g., the network devices may be switched to a 'bit-pump mode'). Services delivered from server(s) to client device(s) via the network devices may be validated, authenticated, etc. The services may be validated or authenticated by, for instance, validating the ownership of the public key associated with the service, through a Pre-Shared Key (PSK), or through other validation methods. The service node may obtain information about the validation information (e.g., information about the public key, PSK, etc., for the service) through initial packets from the client, for instance.

In some instances, cloud services or other remotely-hosted software may relay traffic through a customer's firewall over an extended period of time. Such traffic may be encrypted. Furthermore, such traffic may pass through multiple components (or proxies, network devices, intermediary devices, etc.) in the path from server to client. In such instances, a separate cryptographic context is created between each network device in the path. The separate cryptographic contexts may delay traffic and increase load as the traffic is decrypted and re-encrypted on each leg.

Where multiple network devices are located between the service node and the servers, traffic is decrypted and re-encrypted on each leg. According to certain embodiments described herein, while network devices may be in-line (e.g., in the path between the server and client), the network devices may operate in a 'bit-bump mode', or pass through encrypted network traffic, hence avoiding unnecessary decryption and re-encryption of traffic by intermediary network devices. To avoid unnecessary encryption and decryption of data traffic by the network device(s), the service node can negotiate an end-to-end cryptographic context using inline messages.

In some implementations, during end-to-end cryptographic context negotiation, the service node may validate the service. The service node may validate the service by validating ownership of a public key associated with the service. The service node may validate the service through a Pre-Shared Key (PSK). The service node may validate the service through a parameter uniquely associated with the service. The service node may validate the service through authentication of the service. Such information (e.g., public key, PSK, parameter, etc.) may be obtained by the service node in/through/using initial packets from the client, for instance.

Where an end-to-end cryptographic context is established, the service node may instruct the network devices to switch to 'bit pump mode,' or pass network traffic directly through to the client without decrypting and re-encrypting the network traffic at the network devices. The service node may so instruct the network devices by sending an encrypted message using an existing cryptographic context established with that network device. The network device may decrypt the packet containing the instructions and prepare to switch to 'bit pump mode' according to the instructions for instance. The network device may re-encrypt the instructions (e.g., using a corresponding cryptographic context previously established with the next network device) and pass the encrypted packet to the next network device in the chain. Such a process may be repeated until the packet containing the instructions is propagated from the service node through the network devices to the server hosting the service.

In some embodiments, each of the network devices may provide an acknowledgement (e.g., back along the chain of network devices) of receiving the instructions prior to switching to 'bit pump mode.' Hence, the network devices may wait for an acknowledgement from the next network device prior to switching to 'bit pump mode.'

In some implementations, some network devices (e.g., those on the client-side) may not require or use cryptographic contexts (sometimes referred to as "crypto contexts"). Such network devices may switch to bit pump mode following the service node establishing end-to-end cryptographic context. For instance, with Citrix Inc.'s Netscaler gateway service (NGS), where a connector may be an only component on the client-side, the connection between connector and service node may not require a cryptographic context. In such a scenario, establishing an end-to-end crypto context for data traffic between service node and servers through the connector would work similar to on-premises support of gateway features. Hence, such implementations may not require any modification of the server.

Once an end-to-end cryptographic context is created between the service node in the cloud (e.g., a network that can include network device(s)) and the server, the network devices are switched to 'bit pump mode', avoiding unnecessary decryption and re-encryption of data packets. Hence, although the network devices may be inline and can span across one or more networks, they operate in 'bit-pump mode' with an end-to-end cryptographic context established.

In some embodiments, for instance embodiments corresponding to cloud-based VPX (e.g., an intermediary device that provides web and application load balancing, secure and remote access, acceleration, security and/or offload feature set in a virtual appliance), some hardware may not be capable of or configured to establish cryptographic capabilities. Hence, such networks and computing environments rely on various software cryptographic engines for encryption and decryption, which is time consuming and can negatively impact traffic load.

In implementations including a Remote Desktop Protocol (RDP) network device which uses CredSSP (or other) encryption for instance, the certification used within the encryption protocol may be the same certification used in the Transport Layer Security (TLS) or Datagram Transport Layer Security (DTLS) handshake for establishing the connection between the server and a Virtual Desktop Agent (VDA). When multiple TLS/DTLS offloads are involved, data packets with TLS/DTLS may be encapsulated within other TLS/DTLS for establishing the necessary connections. Such encapsulation may deteriorate performance and user experience. Further, such encapsulation may involve fragmentation and re-assembly for some packets due to multiple encapsulation (TLS/DTLS over TLS/DTLS).

By establishing an end-to-end cryptographic context and avoiding multiple unnecessary decryption and re-encryption of data traffic by network devices, many cloud-based features may operate similar to on-premise features. Hence, features may be delivered and supported faster on cloud, thus improving time to market availability of existing cloud-based features.

Figure 5:
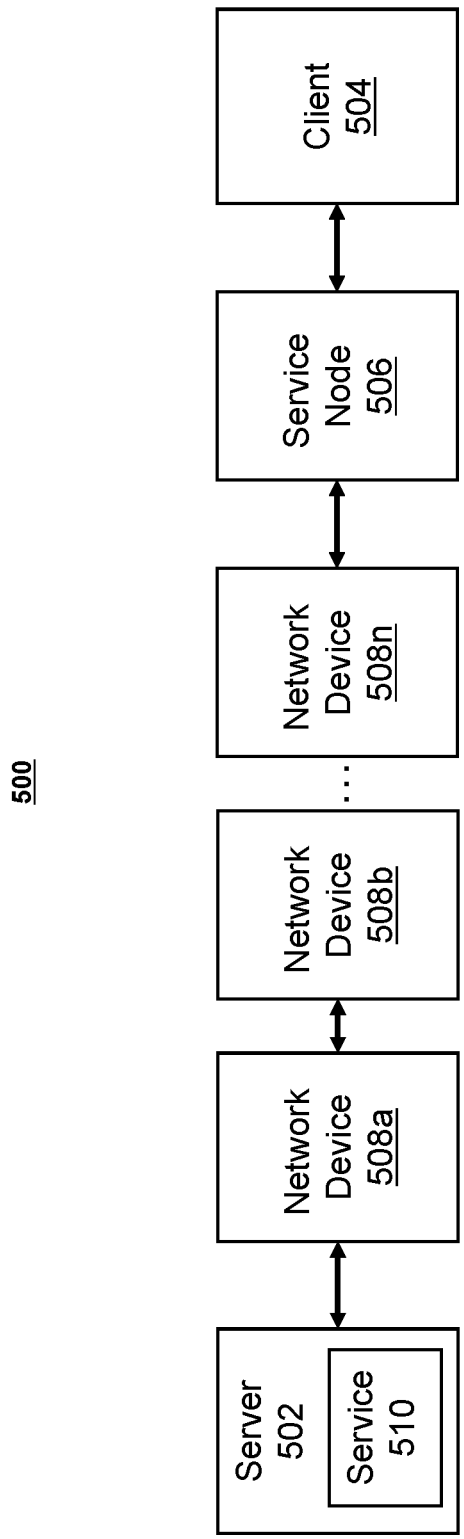
FIG. 5 is a block diagram of an embodiment of a system for establishing an end-to-end cryptographic context, according to an illustrative embodiment.

Referring now to FIG. 5, depicted is a system 500 for establishing an end-to-end cryptographic context, according to an illustrative embodiment. In overview, the system 500 may include one or more servers 502 (referred to as server 502), one or more clients 504 (referred to as client 504), a service node 506, and one or more network devices 508a-508n (also referred to as network device(s) 508). The server 502 may host, provision, execute, or otherwise include one or more services 510 (referred to as service 510). The service 510 may be delivered or provisioned from the server 502, through the network device(s) 508, to the client 504. The service node 506 may be configured to validate the service 510 to be delivered to the client 504. The service node 506 may establish an end-to-end cryptographic context between the service node 506 and the server 502 through the network device(s) 508. A first network device 508 may share a cryptographic context with the service node 506, which the service node 506 may use for establishing the end-to-end cryptographic context. The service node 502 may transmit a message to the first network device 508, encrypted using the shared cryptographic context, which informs the first network device 508 to pass through encrypted traffic.

The systems and methods of the present solution may be implemented in any type and form of device, including clients, servers and/or appliances 200 described above with reference to FIG. 1A-FIG. 1B, FIG. 2 and FIG. 4. As referenced herein, a "server" may sometimes refer to any device in a client-server relationship, e.g., an appliance 200 in a handshake with a client device 102. The server 502 may be an instance, implementation, or include aspects similar to server 106a-n described above with reference to at least FIG. 1A. Similarly, the client 504 may be an instance, implementation, or include aspects similar to any of the clients 102 a-n described above with reference to FIG. 1A. The present systems and methods may be implemented in any intermediary device or gateway, such as any embodiments or aspects of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

The server 502 may host one or more services 510. Each of the services 510 can include or correspond to any type or form of application or service. The application or service may include a network application, a web application, a Software-as-a-Service (SaaS) application, a remote-hosted application, and so on. As some non-limiting examples, an application can include a word processing, spreadsheet or other application from a suite of applications (e.g., Microsoft Office360, or Google docs), an application hosted and executing on a server for remote provisioning to a client, and/or a HTML5-based application. Packets corresponding to service(s) 510 may be encrypted by the server 502 and transmitted or delivered to the client 504.

In some embodiments, the client 504 may reside at a branch office and may operate within a client-side network, which may include or correspond to a private network (e.g., a local area network (LAN) or wide area network (WAN)) between or spanning the client 504 and client-side network device(s) 508. In some embodiments, the server 502 and the client 504 may be communicably coupled to one another via a private network (e.g., a LAN or a software-defined wide area network (SD-WAN)). The server 502 may reside at a server or data center, and may operate within a server-side network, which may also be a private network (e.g., a LAN, WAN, etc.).

A network device 508a-n can include or correspond to any type or form of intermediary device, network device or appliance, gateway device, middle box device and/or proxy device, such as but not limited to a Netscaler device, SD-WAN device, and so on. As described in greater detail below, each (or at least some) of the server 502, client 504, network device(s) 508, and service node 506 may be communicably coupled in series. In some embodiments, each of the server 502, network device(s) 508, and service node 506 may share a cryptographic context with an adjacent (e.g., paired) component or device. Such a cryptographic context may be similar to one another, or may be different from other cryptographic contexts.

The service node 506 may reside or be intermediary between the network device(s) 508 and the client 504. The service node 506 may be configured to execute, support and/or facilitate various functions corresponding to traffic between the server 502 (e.g., relating to the service 510) and the client 504, such as functions to provision the service 510 from the server 502 to the client 502 for instance. As described in greater detail below, the service node 506 may generally be configured to validate a service, establish an end-to-end cryptographic context, and transmit encrypted message(s) to the network device(s) 508 which can enable or cause the network device(s) 508 to pass traffic (e.g., in a bit-pump mode).

Figure 6:
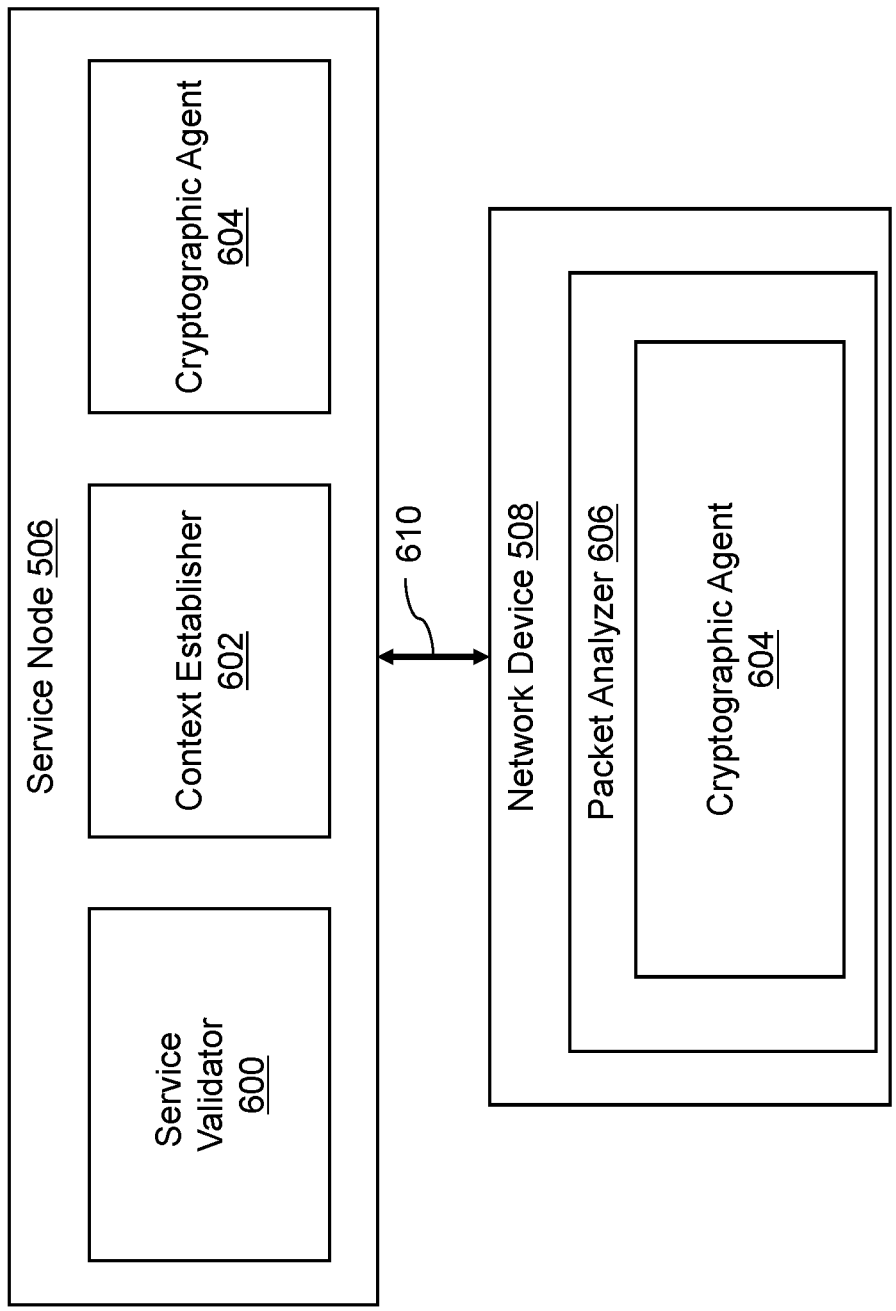
FIG. 6 is a block diagram of a service node and network device of the system of FIG. 5, according to an illustrative embodiment.

Referring to FIG. 6, depicted is a block diagram of the service node 506 and network device 508, according to an exemplary embodiment. The service node 506 is shown to include a service validator 600, a context establisher 602, and an cryptographic agent 604. The cryptographic agent 604 can be designed or configured to encrypt and/or decrypt network traffic using a cryptographic context, as described in greater detail below. The network device 508 is shown to include a packet analyzer 606 having a cryptographic agent 604 cryptographic agent 604 (e.g., similar to the cryptographic agent 604 of the service node 506). In this regard, both the service node 506 and network device 508 may be configured to encrypt and/or decrypt network traffic. The service validator 600 may be designed or implemented to validate a service 510 delivered from the server 502 to the client 504. The context establisher 602 may be configured or used to establish an end-to-end cryptographic context between the server 502 and the service node 506 for delivering encrypted traffic. The cryptographic agent 604 may be configured to encrypt messages (or packets) which are communicated between the service node 506 and the network device 508 using a shared cryptographic context 610. The packet analyzer 606 may include a cryptographic agent 604 configured to decrypt the encrypted messages (e.g., for access to and/or interpretation of content or data in the encrypted messages) and for re-encrypting the decrypted message for communicating to other network devices in the network path to the server 502.

The service node 506 may be configured to receive packets from the client 504 and/or from the server 502. The packets may incorporate or include data generated by the client 504 or the server 502. For instance, the data may request information corresponding to the service 510 (e.g., information that forms a part of the service 510) from the server 502. The data may include or correspond to information from the server 502 as requested.

Each packet received by the service node 506 (and communicated or otherwise exchanged through the network) may include header information and a payload. The header information and the payload of each packet may be generated in accordance with any number of communication protocols at any network stack layer, such as: an Application Layer protocol (e.g., HyperText Transfer Protocol (HTTP), Common Internet File System (CIFS), Messaging Application Programming Interface (MAPI)), a Transport Layer protocol (e.g., Transmission Control Protocol (TCP) and User Datagram Protocol (UDP)), and a Network Layer protocol (e.g., Internet Protocol (IP), Internet Protocol Security (IPsec), and Datagram Delivery Protocol (DDP)), among others. The network stack layer can include any of the layers in the Open Systems Interconnection (OSI) model or the Internet protocol suite.

The header information of the packet may also be generated in accordance with any number of communication protocols at any network stack layer. In some embodiments, the header information for a packet generated in accordance with a Transport Layer (or layer 4 or L4 according to the OSI model) protocol may include Transport Layer header information. In some embodiments, the header information for a packet generated in accordance with a Network Layer (or layer 3 or L3) protocol may include Network Layer header information. In some embodiments, the header information for a packet generated in accordance with an Application Layer protocol may include Application Layer header information. In general, the header information of the packet may include a source address, a source port, a destination address, a destination port, a session identifier, a protocol number, one or more options, and/or a checksum, among others. The source address or source port may correspond to the client 504 or server 502. The destination address or destination port may correspond to the client 504 or server 502. The header information 545 may include one or more header fields (e.g., of HTTP protocol) as specified by the communication protocol.

The header information of the packet may also include metadata. In some embodiments, the metadata of the header information of the packet may be associated with the application or service 510 running on the client 504. The metadata associated with the service running on the client 504 for which the packet is generated may include, for example, an indicator specifying that the packet is application-specific, an account identifier for the client 504 (e.g., including or corresponding to a user profile, email address, or screenname), a service 510 identifier (e.g., a name of the service 510), a profile of the service 510 (e.g., version number of the service 510), and a timestamp corresponding to generation of the packet, among others.

In some embodiments, the header information may contain validation information. The validation information may be included in the metadata or separate from the metadata. The validation information may be used for validating the service 510. The validation information may include, for instance, an encrypted message generated using a public key, an encrypted message using a pre-shared key (PSK), a digital certificate, a parameter or unique identifier associated with the service 510, authentication information (such as a digital signature, a pin, digital fingerprint, software token, etc.), or other information which may be used to validate the service 510 and/or the server 502, and/or validate the client's 504 access to the service 510.

The payload of the packet may include data generated by the client 504, the server 502, or one of the network devices 508. In some embodiments, the payload of the packet received from the client 504 may include a request to access resources hosted on the server 502 for the service 510 (e.g., a function call). In some embodiments, the data of the payload (or data of the packet) may be unencrypted by the application running on the client 504. In some embodiments, the data of the payload may be encrypted by the application running on the client 504. The application running on the client 504 may apply any number of cryptographic algorithms, operations and/or functions to the data to include into for instance the payload of the packet to send to the server 502. In some embodiments, the payload of the packet received from the server 502 may include data from the resources hosted at the server 502 for the application (e.g., return to the function call) running on the client 504. In some embodiments, the data of the payload may be unencrypted by the server 502. In some embodiments, the data of the payload may be encrypted by the server 502. In response to receipt of a request from the client 504 through the network 104', the server 502 may apply any number of cryptographic algorithms to the data to include into the payload of the packet to send to the client 504. In some embodiments, the client 504 or the server 502 may apply the cryptographic algorithms, operations, and/or functions onto the header information and/or payload of the packet.

The service validator 600 may be designed or implemented to obtain, extract, identify, or otherwise use data contained in the packets for validating the service 510. Such data used by the service validator 600 for validating the service 510 may be contained in the header, in the metadata, etc., for the packets. The service validator 600 may be configured to validate the service 510 in one or a number of ways. The service validator 600 may validate the service 510 prior to negotiation of an end-to-end cryptographic context, during negotiation of an end-to-end cryptographic context, or following (e.g., shortly after) negotiation of an end-to-end cryptographic context.

Negotiation of the end-to-end cryptographic context can involve communication between any two or more of the following nodes: server 520, network devices 508, service node 506 and/or client 504. Negotiation of the end-to-end cryptographic context can include handshaking communications, passing of information (e.g., including instructions) from the context establisher 602 between or across the nodes, adjustment/acknowledgement/acceptance/counter-proposal on the information at certain node(s), and/or establishment of the end-to-end cryptographic context. Further, in some embodiments, the service validator 600 may be configured to use one validation technique or multiple validation techniques for validating the service 510. In still other embodiments, service validation may be foregone or omitted (e.g., not performed) in some instances or cases, as described in greater detail below.

The service validator 600 may be designed or implemented to validate the service 510 based on ownership of a public key. In some embodiments, the service validator 600 may distribute, disseminate, disburse, provide, generate or otherwise output public keys. The public keys may be disseminated widely. Hence, any entity, computing device, etc., which possesses the public key may encrypt a message or data using the public key. The server 502 which executes the service 510 may receive the public key. The service 510 may be configured to deliver an encrypted message or data to the service node 506. The message may be encrypted using the public key from the service validator 600. The service validator 600 may maintain a private key which is used for decrypting messages. Upon receipt of an encrypted message from the service 510 (e.g., within metadata accompanying a packet, within the header of a packet, etc.), the service validator 600 may be configured to decrypt the message using the private key. The service validator 600 may be configured to validate the service 510 based on the contents of the decrypted message (e.g., successful decryption using the private key corresponding to the public key), based on the service 510 using the public key to encrypt the message, etc.

The service validator 600 may be designed or implemented to validate the service using information about a pre-shared key (PSK). Prior to exchanging any packets between the service 510 and the service node 506, the service validator 600 may be configured to communicate a pre-shared key. The pre-shared key may include or correspond to a string of characters or dataset which may be used as a validation key. The service validator 600 and service 510 may be configured to generate and exchange hash values based on the pre-shared key(s). Following exchanging of the hash values (e.g., within metadata accompanying a packet, within the header of a packet, etc.), the service validator 600 may validate the service using the hash value from the service 510.

The service validator 600 may be designed or implemented to validate the service 510 using information about a parameter uniquely associated with the service 510. The service validator 600 may be configured to deliver, communicate, or otherwise provide the parameter (e.g., a unique identifier, a pin, a token, etc.) to the service 510. The service validator 600 may provide the parameter to the service 510 at enrollment (e.g., when the service 510 is registered with the service node 506, for instance). The service validator 600 may be configured to maintain a list or database of parameters and their corresponding services 510. The service 510 may be configured to deliver information corresponding to the parameter (e.g., the parameter itself, a hash value associated with the parameter, etc.) to the service validator 600. The service 510 may deliver the information corresponding to the parameter to the service validator 600 within metadata accompanying a packet, within the header of a packet, etc. The service validator 600 may cross-reference the information corresponding to the parameter with stored information (e.g., the list of parameters and services 510 maintained by the service validator 600). The service validator 600 may be configured to validate the service 510 based on the information corresponding (e.g., uniquely corresponding) to the parameter.

The service validator 600 may be configured to validate the service 510 by authenticating the service 510. In other words, the service validator 600 may authenticate the service 510 for the purpose of validating the service 510. The service validator 600 may authenticate the service 510 to confirm that the packet is delivered by the proper entity (e.g., the service 510 in fact, instead of an entity that may be trying to pass off as the service 510). The service validator 600 may authenticate the service 510 using, for instance, a handshaking between the service 510 and service validator 600, a security token, a PIN or other unique identifier, etc. In some embodiments, the service validator 600 may be configured to authenticate the service 510 using one or more of the methods of validating the service 510 described above. In some embodiments, the service validator 600 may be configured to both authenticate the service 510 and validate the service 510. The service validator 600 may validate the service 510 using one technique, and the service validator 600 may authenticate the service 510 using another technique.

In some embodiments, service validation may be foregone or omitted (e.g., does not occur). Such instances or cases may depend on the type of service 510 (e.g., where the service 510 is publicly available, where the service 510 is an enterprise service), whether the service 510 has recently been validated or authenticated, etc. In some embodiments, the service validation may be foregone depending on which particular user(s) is/are accessing the service 510. For instance, the service validator 600 may apply one or more policies to determine whether a particular service 510 or services 510 in general are to be validated.

Policies can be accessed, retrieved, selected, applied and/or otherwise used by the service validator 600 for determining whether to validate a particular service 510 (or services, generally). The policies can be stored or maintained in a storage component at or on the service node 506 and/or in a network location accessible by the service node 506. The service validator 600 can apply the one or more policies on a service 510 attempting to deliver packets to the client 504. For example, the service validator 600 can apply the one or more policies on metadata or header portion of a packet intercepted by the service node 506. The policies may indicate to always validate services being provisioned to particular clients (e.g., clients 504 of particular users or types of users). For instance, some users may be upper-management personnel and, thus, their corresponding clients 504 may include sensitive or confidential information. The policies may indicate that a service 510 should be validated, by determining that certain clients 504 should not accept packets from non-validated services 510, to prevent or lessen the likelihood of malicious content being delivered to those clients 504. In some embodiments, the policies may indicate that certain types of services 510 should be validated, regardless of the recipient. For instance, the policies may indicate that services 510 which are to deliver certain types of data (e.g., sensitive data), services 510 outside of an enterprise, etc., should be validated for security reasons. The service validator 600 may be configured to apply the policies to determine whether or not to validate particular services 510.

The context establisher 602 may be configured or used to establish an end-to-end cryptographic context between the service node 506 and server 502 through at least one network device 508. An end-to-end cryptographic context can refer to a cryptographic context that extends (e.g., is shared) between a sender (or source) and recipient (or destination) of traffic, and also extends over (e.g., is shared with) network node(s) intermediary between the sender and the recipient. An end-to-end cryptographic context can be configured such that the traffic is not decrypted by any of the intermediary nodes. Accordingly, in-flight and stored data remains encrypted and is not decrypted by intermediary network nodes other than nodes corresponding to the source or final destination. More generally, a cryptographic context can include or correspond to an encryption or decryption configuration, standard and/or protocol shared between two or more nodes that are in communication with each other. The end-to-end cryptographic context, however, may refer or pertain to encryption of packets throughout the time between encryption by the sender (e.g., source of the packets) and decryption by the recipient (e.g., ultimate destination). In this regard, intermediaries (e.g., network devices 508, intermediary devices, etc.) may not decrypt the packet in an end-to-end cryptographic context. Rather, in an end-to-end cryptographic context, the packet remains encrypted up to and until the packet reaches the intended recipient. Hence, the cryptographic agent 604 of the service node 506 may encrypt content to be delivered to the server 502. If the context establisher 602 does not establish an end-to-end cryptographic context (e.g., the cryptographic context is shared between adjacent nodes from the service node 506 to the server 502), the content or traffic encrypted by the cryptographic agent 604 may be delivered from the service node 506 to the network device 508, decrypted, and analyzed by the packet analyzer 606. The cryptographic agent 604 for the packet analyzer 606 may be configured to decrypt the packet based on a cryptographic context 610 shared (e.g., only) between the service node 506 and network device 508. The packet analyzer 606 may determine that the packet is intended for a different recipient, may re-encrypt the packet using the cryptographic agent 604 for the packet analyzer 606, and deliver the re-encrypted packet to a next network device 508.

The context establisher 602 may be configured to form, create, generate, or otherwise establish a cryptographic context 610 between the context establisher 602 and a network device 508. The context establisher 602 may be configured to establish a cryptographic context 610 with the network device 508 for encrypting and decrypting network traffic. The context establisher 602 may be configured to establish the cryptographic context 610 with the network device 508 so that the service node 506 can form and/or secure a connection with the network device 508. Hence, the cryptographic context 610 between the network device 508 and the service node 506 may exist prior to any establishment of an end-to-end cryptographic context. The cryptographic context 610 may be or include any information regarding a cryptographic arrangement, configuration and/or algorithm (e.g., cryptographic protocol, procedure, process, construct, formulation, key(s), credentials and/or secret(s)) which is/are to be used for encrypting and decrypting network traffic. The cryptographic context 610 can incorporate or include: one or more symmetric-key algorithms, such as block ciphers (e.g., Advance Encryption Standard (AES) of 128 bits or 256 bits, Rivest Cipher-5 (RC5) of 64 bits or 128 bits, or Blowfish cipher), stream ciphers (e.g., A5/1, A5/2, HC-256, or Rivest Cipher-4 (RC4) or 1684 or 2064 bits), or others (e.g., Kerberos protocol); asymmetric-key algorithms (e.g., Digital Signature Algorithm, Elliptic Curve algorithm, Rivest-Shamir-Adleman (RSA), and Diffie-Hellman key exchange protocol); and cryptographic hash functions (e.g., hash-based message authentication code (HMAC), message-digest algorithm (MD5), and Secure Hash Algorithm (SHA-1, SHA-2, and SHA-3)). The cryptographic context 610 can incorporate, specify or include key-related information, such as a set of non-secret key-value pairs. The cryptographic context 610 can provide an indication (e.g., an identifier, handle, name and/or type) of a cryptographic service provider (CSP), and can include the specification of a particular key container (e.g., within the CSP). The cryptographic context 610 can incorporate, specify or include information (e.g., parameters) for creating, establishing, identifying, accessing and/or using a key container and/or keys (e.g., a session key). In some embodiments, each of the network devices 508 may share a cryptographic context with a directly adjacent network device 508 (or server 502) in the network path between the server 502 and service node 506. For instance, the n-th network device 508 nearest to the server 502 may share a cryptographic context with the server 502. Such cryptographic contexts may each be the same or may be different from one or more of the other cryptographic contexts.

The context establisher 602 may be configured to form, create, generate, or otherwise establish the end-to-end cryptographic context between the service node 506 and the server 502 through the network device 508. The context establisher 602 may be configured to establish the end-to-end cryptographic context following (or before, or in parallel with, or independent of) validation of the service 510. The context establisher 602 may be configured to establish the end-to-end cryptographic context so as to secure the traffic exchanged between the server 502 and the client 504, e.g., following validation of the service 510. The context establisher 602 may be configured to establish the end-to-end cryptographic context by communicating messages between the server 502, the service node 506, and/or other nodes. For instance, the service node 506 may be configured to communicate a message or request to the server 502 requesting the end-to-end cryptographic context. In some instances, the server 502 may be configured to communicate a message or request to the service node 506 to generate the end-to-end cryptographic context. The service node 506 and server 502 may be configured to perform, for instance, a handshake process to authenticate each other and, following such authentication, the service node 506 may establish the end-to-end cryptographic context.

The context establisher 602 may be configured to, create, construct, produce, or otherwise generate a message for transmitting or propagating to the network device(s) 508. The message may instruct, direct, or otherwise inform the network device(s) 508 to pass network traffic which is encrypted using the end-to-end cryptographic context through the network device(s) 508. The message may include an identification and/or information of the end-to-end cryptographic context which is established between the server 502 and service node 506. In some embodiments, the message may include a duration (e.g., for bit-pump mode) during which the network devices 508 are to pass through network traffic which is encrypted using the end-to-end cryptographic context. In some embodiments, the context establisher 602 may renew the end-to-end cryptographic context, relative to such a duration for instance (e.g., before the bit-pump mode duration ends).

The cryptographic agent 604 at the service node 506 may be configured to encrypt the message generated by the context establisher 602, for transmitting the message to the (adjacent) network device 508. The cryptographic agent 604 may be configured to encrypt the message using the cryptographic context 610 shared between the network device 508 and the service node 506. In other words, the cryptographic agent 604 may be configured to encrypt the message using the cryptographic context 610 between the network device 508 and service node 506, rather than the end-to-end cryptographic context 610 (which is yet to be activated, e.g., for bit-pump mode operation).

The context establisher 602 may be designed or implemented to deliver, communicate, provide, provision, or otherwise transmit the encrypted message to the network device 508. The context establisher 602 may deliver the encrypted message to the network device 508 using a network connection established between the service node 506 and network device 508. As stated above, the encrypted message may inform the network device 508 which receives the encrypted message to pass through traffic that is encrypted using the end-to-end cryptographic context (e.g., without decrypting and/or re-encrypting the traffic). Rather, information or instructions in the encrypted message may indicate to or instruct the network device 508 to pass traffic through without any decryption and subsequent re-encryption. The encrypted message may form or cause a number of inline messages to be protected and propagated across multiple network nodes using a series of local pre-existing cryptographic contexts, to securely negotiate and establish an end-to-end cryptographic context extending from the service node 506 to the server 502 for instance.

The network device 508 may be configured to receive and analyze the encrypted message. The cryptographic agent 604 may be configured to decrypt the encrypted message received from the context establisher 602 via the service node 506. The cryptographic agent 604 may be configured to decrypt the encrypted message using the cryptographic context 610 shared between the network device 508 and service node 506. The network device 508 may negotiate, instruct or otherwise communicate with adjacent and/or other network nodes, to set, form and/or agree on an end-to-end cryptographic context using information in the decrypted message. For example, the decrypted message may instruct, direct, inform, or otherwise indicate that the network device 508 is to pass traffic that is encrypted using the end-to-end cryptographic context through the network device 508, e.g., in bit-pump fashion without decrypting and re-encrypting such traffic at the network device 508. The decrypted message may also indicate or provide information about the end-to-end cryptographic context to be used. Hence, upon receiving and decrypting the encrypted message from the service node 506, the network device 508 may be informed of the end-to-end cryptographic context to be used between the server 502 and service node 506, and that traffic encrypted using the end-to-end cryptographic context is to be passed through the network device 508 (e.g., directly, without cryptographic operations on such traffic).

Where there are multiple network devices 508 arranged, situated, or otherwise located between the server 502 and the service node 506, the network device 508 which received the encrypted message from the service node 506 may be configured to pass information in the encrypted message to other network devices 508 that are arranged subsequent to the receiving network device 508. The encrypted message may be processed (e.g., decrypted and re-encrypted) at each network device 508 using different pre-existing, local cryptographic contexts established in connection with each adjacent node or network device 508. Information or instructions in the encrypted message may cause or instruct the network device 508 to re-encrypt the message and deliver the message to the next network device 508 in the network route to the server 502, using a cryptographic context pre-established for the network device 508 and the next network device. For instance, the first network device 508a may be configured to receive and decrypt the encrypted message from the service node 506 using a first cryptographic context. Following receipt and decryption, the first network device 508a may be configured to re-encrypt the message using a cryptographic context for the first and second network device 508a, 508b (which may be the same as or different from the cryptographic context 610 between the network device 508a and the service node 506). The first network device 508a may deliver the re-encrypted message to the second network device 508b, and so forth. In other words, the encrypted message may be passed from the service node 506 to each network device 508 situated between the server and service node 506. Each network device 508 may be configured to decrypt the encrypted message using a cryptographic context shared between the transmitting and receiving network device 508, receive the indication that the network device 508 is to pass traffic that is encrypted using the end-to-end cryptographic context, and re-encrypt (e.g., according to a next cryptographic context) and pass the encrypted message to the next network device 508 in the route to the server 502.

In some embodiments, the service node 506 may be configured to cause negotiation of the end-to-end cryptographic context through such in-line messages between each of the network devices 508. For instance, the service node 506 may be configured to communicate an encrypted message to the first network device 508a. The first network device 508a may be configured to decrypt the encrypted message using a cryptographic context between the first network device 508a and service node 506. The first network device 508a may be configured to negotiate, adjust, propose, counter-propose, etc., the end-to-end cryptographic context by setting parameters between the first network device 508a and the service node 506. The negotiation between each leg can include multiple message exchanges (e.g., protected using a corresponding local cryptographic context). Upon successful negotiation, the first network device 508a may encrypt a message using for instance a second cryptographic context shared between the first network device 508a and second network device 508b, and communicate the message to the second network device 508b. The second network device 508b may receive the encrypted message and decrypt the message using the second cryptographic context. The first network device 508a and second network device 508b may be configured to negotiate the end-to-end cryptographic context by negotiate, adjusting, proposing, counter-proposing, etc., the parameters of the end-to-end cryptographic context. Such negotiation may occur between each leg (e.g., each adjacent pair of network nodes) from the service node 506 until successful negotiation by the last network device 508n and server 502.

In some instances and examples, the first network device 508a and second network device 508b may arrive at or agree to the same parameters agreed-upon by the first network device 508a and service node 506. In other instances and examples, the first network device 508a and second network device 508b may arrive at or agree to different parameters than those agreed upon by the first network device 508a and service node 506. In such cases, the first network device 508a and service node 506 may re-negotiate the end-to-end cryptographic context. Such back-and-forth negotiation between various stages and/or nodes may occur until each of the network devices 508 between the service node 506 and server 502 agree on the end-to-end cryptographic context. At each leg, the network devices 508 may exchange encrypted messages using a shared cryptographic context between the sending and receiving network devices 508 (or nodes) to negotiate the end-to-end cryptographic context. In some instances, the negotiation between the first and second network device 508a, 508b may be within the parameters set by the first network device 508a and service node 506. Hence, the negotiation downstream from the service node 506 and first network device 508a may fall within the negotiated parameters set by the first network device 508a and service node 506 (or set in each prior leg). The final negotiated parameters (e.g., established in the final leg with the server 502 for instance) may be communicated to the prior nodes via inline acknowledgement messages, for example.

In some embodiments, the end-to-end crypto context negotiation can occur through inline messages with handshake packets that are encrypted and decrypted at each leg, where the intermediary nodes (network devices 508) encrypt and decrypt handshake packets and merely pass the handshake packets without involving in negotiation, adjustment, proposing, counter-proposing for instance. In such embodiments, each of the network devices 508 between the service node 506 and server 502 may receive and decrypt the handshake packets, re-encrypt and pass on the handshake packets. In this regard, the network devices 508 may not actively participate in the negotiation of the end-to-end cryptographic context. Rather, the network devices 508 facilitate exchange or transmission of the handshake packets. Similarly, handshake packets in the reverse direction are also secured through already existing cryptographic contexts along the path between server/service and service node.

In some embodiments, following successful negotiation of the end-to-end context using the inline handshake messages (e.g., in one or both directions), the service node 506 and/or server 502 may communicate a switch mode message. The switch mode message may instruct each node to switch to the bit-pump mode (e.g., communication using the end-to-end cryptographic context). The switch mode message may be encrypted and decrypted at each leg using a local cryptographic context between (and specific to) each leg. In some embodiments, there can be an acknowledgment for receiving the switch mode message, which can be decrypted and re-encrypted at each leg. In some embodiments, acknowledgement by a receiving node for receiving the switch mode message may not be necessary.

For example and in some embodiments, the switch mode message may instruct the network devices 508 to deliver an acknowledgement message back to the service node 506. For instance, upon receiving and decrypting the message, the first network device 508a may generate, encrypt, and communicate an encrypted acknowledgement message back to the service node 506. The acknowledgement message may acknowledge receipt of the instructions to pass traffic through the network device 508a which is encrypted using the end-to-end cryptographic context. The acknowledgement message may include instructions, guidance and/or a signal to switch to bit-pump operation or mode. The acknowledgement message may include information about negotiated parameters (in a corresponding leg, or across some or all legs) regarding the end-to-end cryptographic context. At each network node, an acknowledgement message may be decrypted at a first local cryptographic context, its contents determined, and certain/all content re-encrypted using a second cryptographic context into an updated acknowledgement message to send to an adjacent network node. For instance, and in some embodiments, the network device 508a may be configured to generate and deliver the acknowledgement message to the service node 506 upon receiving an acknowledgement message from the second network device 508b, and the second network device 508 may be configured to generate the acknowledgement message upon receiving an acknowledgement message from the n-th network device 508n (e.g., an upstream node or network device). In this regard, the first network device 508a may be configured to generate, encrypt, and deliver the acknowledgement message to the service node 506 when each of the other network devices 508 have acknowledged receipt of the encrypted message to pass through traffic that is encrypted using the end-to-end cryptographic context. Thus, the server 502 (or service 510) and/or the network devices 508 may initiate a chain of acknowledgement messages starting from server 502 (or service 510) and/or the n-th network device 508n nearest to the server 502, to the service node 506 or to the first network device 508a nearest to the service node 506. At each node, the acknowledgement message may be encrypted using a shared local cryptographic context (rather than the end-to-end cryptographic context) and passed to the next node until an encrypted acknowledgement is received at the service node 508. In some embodiments, one or more of the acknowledgements may not be necessary. For instance, the network devices 508 may switch to bit-pump mode upon receipt of the switch mode message (and/or following successful negotiation of the end-to-end cryptographic context) without providing any acknowledgement.

Following establishment of the end-to-end cryptographic context, receipt of the encrypted message by the server 502 and each of the network devices 508 situated between the server 502 and service node 508, and acknowledgement thereof, the service 510 and/or client device 504 may generate ad communicate data or packets (generally, network traffic). The client 504/service node 508 and/or server 502 may be configured to encrypt the network traffic using the end-to-end cryptographic context established by the context establisher 602 of the service node 506. The encrypted traffic may be passed from the service node 506 to the server 502 through each network device 508a-508n, and from the server 502 to the service node 506 through each network device 508n-508a. Each network device 508 may be configured to identify or recognize that the network traffic is encrypted using the end-to-end cryptographic context. Rather than decrypting and re-encrypting the network traffic, each of the network devices 508 may pass through the network traffic which is encrypted using the end-to-end cryptographic context. Thus, the network devices 508 are configured to pass traffic that is encrypted using the end-to-end cryptographic context through the network device 508, without decrypting or re-encrypting the traffic at each/any of the network device 508.

In some embodiments, the operations described herein may exclude (or not involve) some or all of the acknowledgement messages. In other words, the acknowledgement messages generated by the network device(s) 508 and received by the service node 508 may be foregone. In such embodiments, the encrypted message transmitted by the service node 508 to the network devices 508 may not necessarily cause, trigger, request and/or require an acknowledgement message. The service node 506 (and other nodes) may for example assume or leverage on the process/arrangement that, when the encrypted message is passed to each of the network devices, the encrypted message is received by each of the network devices 508 and, thus, acknowledgement is not necessary. The service node 506 (and other nodes) may for example assume or leverage on the process/arrangement that, based on the inline negotiation(s), information and/or instructions about the end-to-end cryptographic context is propagated to each of the network devices 508 and, thus, acknowledgement is not necessary.

Figure 7:
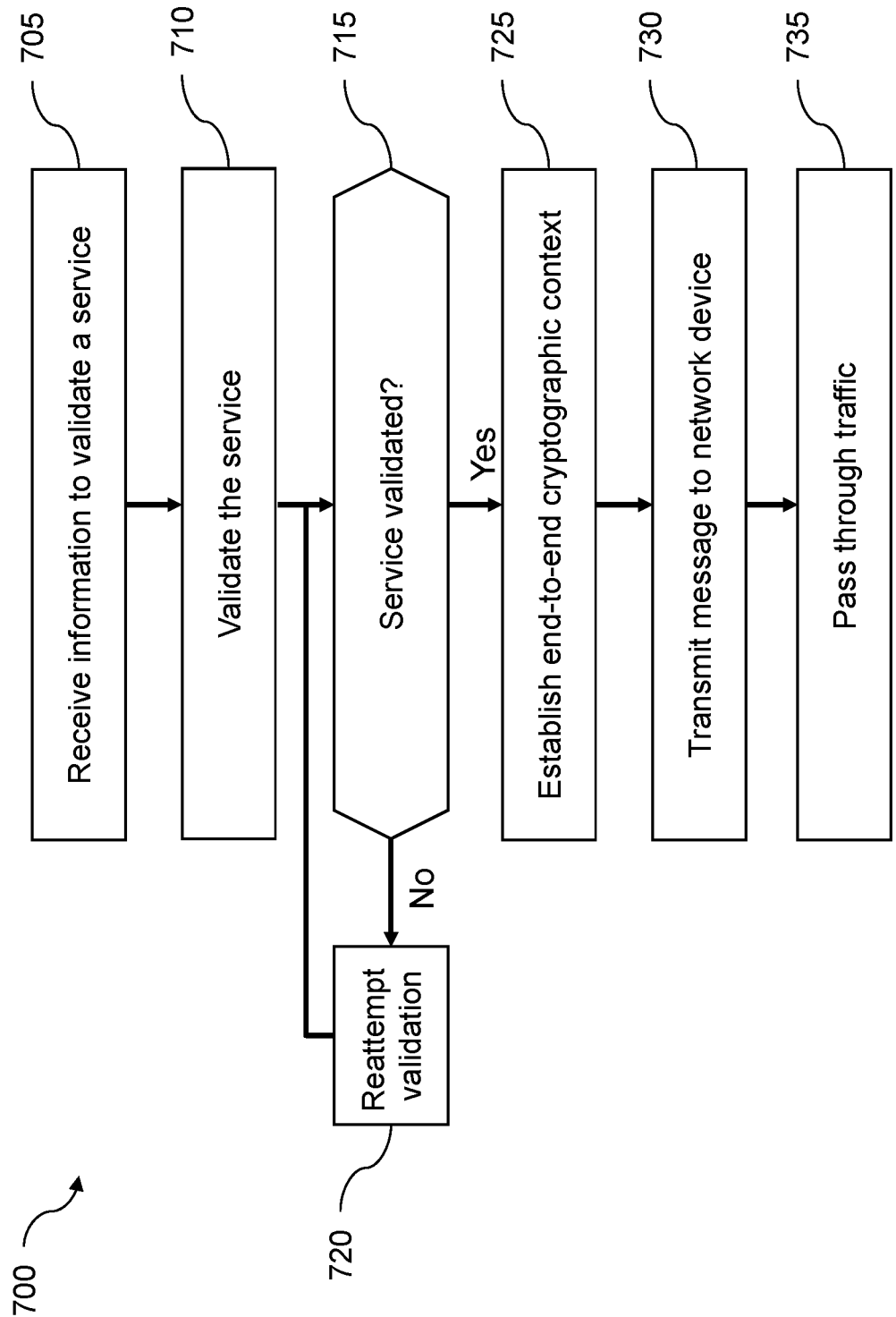
FIG. 7 is a flow diagram of an embodiment of a method of establishing an end-to-end cryptographic context, according to an illustrative embodiment.

Referring now to FIG. 7, depicted is a flow diagram for a method 700 of establishing an end-to-end cryptographic context. The functionalities of method 700 may be implemented using, or performed by, the components described in FIGS. 1-6, such as the service node 506, the server 502, the client 504, and/or the network device(s) 508. In brief overview, a service node receives information to validate a service (705). The service node validates the service (710). The service node determines whether the service has been validated (715). Where the service has not been validated, the service node reattempts validation of the service 720.

Where the service has been validated, the service node establishes an end-to-end cryptographic context (725). The service node transmits a message to a network device (730). The network device passes through traffic that is encrypted using the end-to-end cryptographic context (735).

At operation (705) and, in some embodiments, a service node receives information to validate a service. In some embodiments, the service node receives information to validate a service that a server provides to a client via the service node and at least one network device. The service node may be located intermediary between the client and the server. The at least one network device may be located intermediary between the service node and the server. The service node may receive the information for validating the service in or accompanying a packet delivered from the server to the service node. For instance, the information may be included in a header of the packet. The information may be included in metadata accompanying the packet.

In each of these embodiments, the server may deliver information for validating the service to the service node. The server may encrypt and deliver the information and packet to or via a network device nearest to the server. The server may encrypt the information and packet using a cryptographic context shared between the server and the network device nearest to the server. The network device receiving the information and packet can decrypt the information packet, determine that the network device is not the target or ultimate destination for the packet/information, and deliver the information/packet to the next network device. The network device may re-encrypt the packet/information prior to delivery to the next network device. The packet/information may be encrypted using a shared cryptographic context between the network device and the next network device (which may be similar to or different from the cryptographic context between the server and nearest network device). Such encryption/delivery/receipt/decryption/re-encryption/delivery may be continued along a chain of one or more network devices until the information/packet is received by the service node or the server.

At operation (710) and, in some embodiments, the service node validates the service. The service node may validate the service using the information received from the server. The service node may validate the service using one of a number of different techniques, using multiple techniques, etc. In some embodiments, validation of the service may be foregone or not performed, for instance, based on application of one or more policies, based on the service, etc. The service node can perform the validation of the service prior to, after and/or in parallel with (or independent of) a negotiation or determination of an end-to-end cryptographic context.

The service node may validate the service based on ownership of a public key. In some embodiments, the service node may distribute, disseminate, disburse, or otherwise output public keys. The public keys may be disseminated widely. Hence, any entity, computing device, etc., which possesses the public key may encrypt a message or data using the public key. The server which executes the service may receive the public key. The service may deliver an encrypted message or data to the service node (e.g., through the network devices). The message may be encrypted using the public key from the service node. The service node may maintain a private key which is used for decrypting messages. Upon receipt of an encrypted message from the service (e.g., within metadata accompanying a packet, within the header of a packet, etc.), the service node may decrypt the message from the service using the private key. The service node may validate the service based on successful decryption of the message, based on the contents of the decrypted message, based on the service using the public key to encrypt the message, etc.

The service node may validate the service using information about a pre-shared key (PSK). Prior to exchanging any packets between the service and the service node, the service node may communicate a pre-shared key to the server executing the service. The pre-shared key may be a string of characters or dataset which may be used a validation key. The service node and service may be configured to generate and exchange hash values based on the pre-shared keys. Following exchanging of the hash values (e.g., within metadata accompanying a packet, within the header of a packet, etc.), the service node may validate the service using the hash value from the service.

The service node may validate the service using information about a parameter uniquely associated with the service. The service node may deliver, communicate, or otherwise provide the parameter (e.g., a unique identifier, a pin, a token, etc.) to the service. The service node may provide the parameter to the service at enrollment (e.g., when the service is registered with the service node, for instance). The service node can maintain a list or database of parameters and their corresponding services. The service may deliver information corresponding to the parameter (e.g., the parameter itself, a hash value associated with the parameter, etc.) to the service node. The service may deliver the information corresponding to the parameter to the service node within metadata accompanying a packet, within the header of a packet, etc. The service node may cross-check, match, evaluate or compare the information corresponding to the parameter, with the list of parameters and services maintained by the service node. The service node may validate the service based on the information corresponding to the parameter uniquely associated with the service.

The service node may validate the service by authenticating the service. The service node may authenticate the service so as to validate the service. The service node may authenticate an identified service to confirm that the packet is delivered by the proper entity (e.g., by the identified service itself, rather than a different entity purporting to be the identified service). The service node may authenticate the service using, for instance, a handshake process between the server hosting, maintaining, or otherwise executing the service and the service node, security credentials, digital certificate, a security token, a PIN or other unique identifier, etc. In some embodiments, the service node may authenticate the service using one or more of the methods of validating the service described above. In some embodiments, the service node may both authenticate the service and validate the service. The service node may validate the service using one technique and may authenticate the service using another technique.

At operation (715) and, in some embodiments, the service node determines whether the service has been validated (e.g., at operation (710)). Where the service has not been properly or successfully validated, the service node may reattempt validation of the service at operation (720). The service node may reattempt validation of the service using the same technique (or combination of techniques) used at operation (710) or a different technique (or different combination of techniques) than previously attempted at operation (710). For instance, the service node may use different information received at operation (705) for reattempting validation of the service node (e.g., using authentication instead of a public key where validation via a public key was attempted at operation (710)).

Where the service has been validated, at operation (725) and, in some embodiments, the service node establishes an end-to-end cryptographic context. In some embodiments, the service node may establish the end-to-end cryptographic context between the service node and the server through the at least one network device. The at least one network device may include a first network device that shares a first cryptographic context with the service node. The first cryptographic context may exist prior to establishment of the end-to-end cryptographic context. For instance, the first cryptographic context may be established between the first network device and service node when the first network device is installed, enrolled and/or connected with the service node, etc. The end-to-end cryptographic context may be a cryptographic context which is used for delivering encrypted traffic directly between the server and service node without any network devices decrypting and re-encrypting the traffic. The service node may establish the end-to-end cryptographic context following successful validation of the service (e.g., at operation 710). The service node may establish the end-to-end cryptographic context before or in parallel (or independent of) with the process of validating the service. The service node may establish the end-to-end cryptographic context so as to secure or encrypt the traffic exchanged between the server and the client, e.g., following validation of the service. The service node may establish the end-to-end cryptographic context by communicating messages between the service node and the server hosting the service. For instance, the service node may communicate a message or request to the server requesting the end-to-end cryptographic context. In some instances, the server may communicate a message or request to the service node to generate the end-to-end cryptographic context. The service node and server may be configured to perform, for instance, a handshaking process to authenticate each other, negotiate the end-to-end cryptographic context and, following such authentication and/or negotiation, the service node may establish the end-to-end cryptographic context.

While shown as occurring prior to establishment of the end-to-end cryptographic context, in some embodiments, the service node may validate the service during establishment of the end-to-end cryptographic context, and/or following establishment of the end-to-end cryptographic context. As such, in some embodiments, operation (710) may occur before, simultaneously with, and/or following operation (725).

At operation (730) and, in some embodiments, the service node transmits a message to a first network device. In some embodiments, the service node transmits a message to the first network device encrypted using the first cryptographic context. The service node may transmit the message to the first network device to include information about the end-to-end cryptographic context. The service node may transmit the message to the first network device following negotiation and/or establishment of the end-to-end cryptographic context between the service node and server (e.g., at operation (725)). The service node may transmit the message as a part of establishing the end-to-end cryptographic context. The encrypted message may inform the first network device to pass traffic that is encrypted using the end-to-end cryptographic context, through the first network device (e.g., without performing cryptographic operations at the first network device). The encrypted message may identify and/or specify the end-to-end cryptographic context to be used. The encrypted message may indicate the condition(s) and/or trigger(s) to begin using the end-to-end cryptographic context. The encrypted message may inform the first network device to pass traffic that is encrypted using the end-to-end cryptographic context through the first network device without decrypting or re-encrypting the traffic at the first network device.

The service node may cause the first network device to decrypt the encrypted message using the first cryptographic context. The service node may cause the first network device to decrypt the encrypted message by transmitting the encrypted message to the first network device, which was encrypted by the service node using the first cryptographic context. The first network device receiving the encrypted message may decrypt the message using the first cryptographic context which was used by the service node for encrypting the message. Thus, the initial message (which instructs the network device to pass encrypted traffic through the network device) may be decrypted by the network device. The encrypted message may identify and/or specify the end-to-end cryptographic context to be used and indicate that the first network device is to pass through traffic that is encrypted using the end-to-end cryptographic context.

In some embodiments, the service node may cause the first network device to encrypt the message and transmit the encrypted message to a second network device. The first network device may encrypt the message following (or responsive to) the first network device receiving and decrypting the encrypted message from the service node, and/or inspecting the decrypted message. The first network device may encrypt the message using a second cryptographic context shared between the first and second network devices. The second cryptographic context may be the same as, similar to or different from the first cryptographic context shared between the first network device and the service node. The second cryptographic context may have been established between the network devices prior to the service node negotiating or establishing the end-to-end cryptographic context. For instance, the second cryptographic context may be established between the first and second network devices when either network devices are installed, when the network devices are registered, enrolled or connected with the service node or other networking device, etc.

In some embodiments, the encrypted message transmitted by the service node to the network device(s) may instruct the network devices to provide an acknowledgement message to the service node. The network devices may be each instructed to provide an acknowledgement message to the service node (or preceding network device) following receipt and/or inspection of the encrypted message. The network devices may be instructed to provide the acknowledgement message to the service node (or preceding network device) following receipt of an indication (via the encrypted message) that the network devices are to pass through traffic which is encrypted using the end-to-end cryptographic context. In some embodiments, the network devices may generate and deliver the acknowledgement message upon receipt of the encrypted message originating from the service node. For instance, the first network device may generate and deliver the acknowledgement message to the service node when the first network device receives the encrypted message from the service node, and the second network device may generate and deliver the acknowledgement message to the first network device (or to the service node through the first network device) when the second network device receives the encrypted message from the service node via the first network device. In some embodiments, the first network device may wait to generate and deliver its acknowledgement message until each of the network devices have received and acknowledged receipt of the encrypted message. For instance, the n-th network device nearest to the server may receive the encrypted message. The n-th network device may generate and deliver an acknowledgement message to the next network device, which may then generate and deliver an acknowledgement message to the next network device, and so forth until the first network device receives an acknowledgement message from the second network device. The first network device may then generate and deliver an acknowledgement message to the service node. In other words, the service node may receive an acknowledge message from the first network device which is responsive to the encrypted message and an acknowledgement message received by the first network device.

In some embodiments, following transmittal of the encrypted message (at operation (730)) and acknowledgement of the message, the service node may transmit traffic that is encrypted (or cryptographically processed) using the end-to-end cryptographic context to the first network device. In some embodiments, the server may transmit traffic that is encrypted using the end-to-end cryptographic context to the n-th network device. At each network device (e.g., at the n-th network device, as well as at each network device communicatively coupled along a communications path leading to the service node, the network device may identify that the traffic is encrypted using the end-to-end cryptographic context, and can pass the traffic in bit-pump mode without cryptographically processing the traffic at the network device).

At operation (735) and, in some embodiments, the first network device passes through network traffic which is encrypted using the end-to-end cryptographic context. The first network device may pass through the encrypted network traffic without decrypting and re-encrypting the network traffic. The first network device may transmit the encrypted traffic to the second network device (which also does not decrypt and re-encrypt the encrypted traffic from the first network device), and so forth until the traffic encrypted using the end-to-end cryptographic context reaches the server. The server may decrypt (e.g., in the first instance of decryption) the encrypted traffic using the end-to-end cryptographic context. As such, network traffic which is encrypted using the end-to-end cryptographic context may be maintained encrypted as it passes between the service node and the server. Such embodiments may provide for a secure session between the service and the client using an end-to-end cryptographic context. Such embodiments may allow for efficient processing at intermediary nodes by skipping or avoiding cryptographic operations on the traffic and passing the traffic in bit-pump mode. Further, such embodiments may provide for secure content by ensuring no malicious parties or entities can attempt to intercept, access or use network traffic that would be otherwise decrypted at the intermediary nodes.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

I claim:

1. A system for establishing an end-to-end cryptographic context, the system comprising:
a service node executing on a first device that is intermediary between a client and a server, in communication with a plurality of network devices separate from the first device and arranged intermediary between the first device and the server, wherein the plurality of network devices has a respective cryptographic context between each adjacent pair of the plurality of network devices along a network path between the client and the server, the server providing a service to the client via the service node and the plurality of network devices, the service node configured to:
  obtain information to validate the service;
  establish, responsive to validating the service, an end-to-end cryptographic context between the service node and the server through the plurality of network devices, the plurality of network devices including a first network device that shares a first cryptographic context with the service node and a second cryptographic context with a second network device adjacent to the first network device along the network path, the first cryptographic context and the second cryptographic context existing prior to establishment of the end-to-end cryptographic context, wherein each respective cryptographic context corresponds to an encryption or decryption arrangement for communicating packets between two or more nodes; and transmit a message to the first network device encrypted using the first cryptographic context, to inform the first network device to pass traffic that is encrypted using the end-to-end cryptographic context through the first network device.

2. The system of claim 1, wherein the service node is configured to:

transmit to the first network device a first handshake message encrypted using the first cryptographic context;

cause the first network device to decrypt the encrypted first handshake message using the first cryptographic context, and to encrypt the decrypted first handshake message using the second cryptographic context shared with the second network device, for transmission to the second network device;

receive a second handshake message from the first network device encrypted using the first cryptographic context;

decrypt the encrypted second handshake message using the first cryptographic context; and establish the end-to-end cryptographic context using data in at least one of: the decrypted first handshake message or the decrypted second handshake message.

3. The system of claim 1, wherein the service node is configured to validate the service by at least one of: using data about a pre-shared key (PSK), or validating ownership of a public key associated with the service.

4. The system of claim 1, wherein the service node is configured to validate the service using data about a parameter uniquely associated with the service, the data obtained through one or more packets from the client.

5. The system of claim 1, wherein the service node is configured to validate the service by authenticating the service.

6. The system of claim 1, wherein the service node is configured to transmit the encrypted message to the first network device, to cause the first network device to decrypt the message using the first cryptographic context, and to receive an indication from the decrypted message, that the first network device is to pass traffic that is encrypted using the end-to-end cryptographic context through the first network device.

7. The system of claim 6, wherein the service node is configured to transmit the encrypted message to the first network device, to further cause the first network device to encrypt the decrypted message using the second cryptographic context shared with the second network device, for transmission to the second network device.

8. The system of claim 1, wherein the service node is configured to transmit the encrypted message to the first network device, to cause the first network device to pass traffic that is encrypted using the end-to-end cryptographic context through the first network device, without decrypting or re-encrypting the traffic at the first network device.

9. The system of claim 1, wherein the service node is configured to receive an acknowledgment message from the first network device, the acknowledgment message responsive to the encrypted message and a second acknowledgment message received by the first network device.

10. The system of claim 9, wherein the service node is further configured to transmit to the first network device traffic that is encrypted using the end-to-end cryptographic context, responsive to receiving the acknowledgment message from the first network device.

11. A method for establishing an end-to-end cryptographic context, comprising:

receiving, by a service node executing on a first device that is intermediary between a client and a server, information to validate a service that the server provides to the client via the service node and a plurality of network devices separate from the first device and arranged intermediary between the first device and the server, wherein the plurality of network devices has a respective cryptographic context between each adjacent pair of the plurality of network devices along a network path between the client and the server;

establishing, by the service node responsive to validating the service, an end-to-end cryptographic context between the service node and the server through the plurality of network devices, the plurality of network devices including a first network device that shares a first cryptographic context with the service node and a second cryptographic context with a second network device adjacent to the first network device along the network path, the first cryptographic context and the second cryptographic context existing prior to establishment of the end-to-end cryptographic context, wherein each respective cryptographic context corresponds to an encryption or decryption arrangement for communicating packets between two or more nodes; and transmitting, by the service node, a message to the first network device encrypted using the first cryptographic context, to inform the first network device to pass traffic that is encrypted using the end-to-end cryptographic context through the first network device.

12. The method of claim 11, further comprising:

transmitting to the first network device a first handshake message encrypted using the first cryptographic context;

causing the first network device to decrypt the encrypted first handshake message using the first cryptographic context, and to encrypt the decrypted first handshake message using the second cryptographic context shared with the second network device, for transmission to the second network device;

receiving a second handshake message from the first network device encrypted using the first cryptographic context;

decrypting the encrypted second handshake message using the first cryptographic context; and establishing the end-to-end cryptographic context using data in at least one of: the decrypted first handshake message or the decrypted second handshake message.

13. The method of claim 11, further comprising validating the service by at least one of: using data about a pre-shared key (PSK) or validating ownership of a public key associated with the service.

14. The method of claim 11, further comprising validating the service using data about a parameter uniquely associated with the service, the data obtained through one or more packets from the client.

15. The method of claim 11, further comprising validating the service by authenticating the service.

16. The method of claim 11, further comprising causing, by transmitting the encrypted message to the first network device, the first network device to decrypt the encrypted message using the first cryptographic context, and to receive an indication from the decrypted message that the first network device is to pass traffic that is encrypted using the end-to-end cryptographic context through the first network device.

17. The method of claim 16, further comprising causing, by transmitting the encrypted message to the first network device, the first network device to encrypt the decrypted message using the second cryptographic context shared with the second network device, for transmission to the second network device.

18. The method of claim 11, further comprising causing, by transmitting the encrypted message to the first network device, the first network device to pass traffic that is encrypted using the end-to-end cryptographic context through the first network device, without decrypting or re-encrypting the traffic at the first network device.

19. The method of claim 11, further comprising receiving, by the service node, an acknowledgment message from the first network device, the acknowledgment message responsive to the encrypted message and a second acknowledgment message received by the first network device.

20. The method of claim 19, further comprising transmitting, by the service node to the first network device, traffic that is encrypted using the end-to-end cryptographic context, responsive to receiving the acknowledgment message from the first network device.

* * * * *